Figure 1:
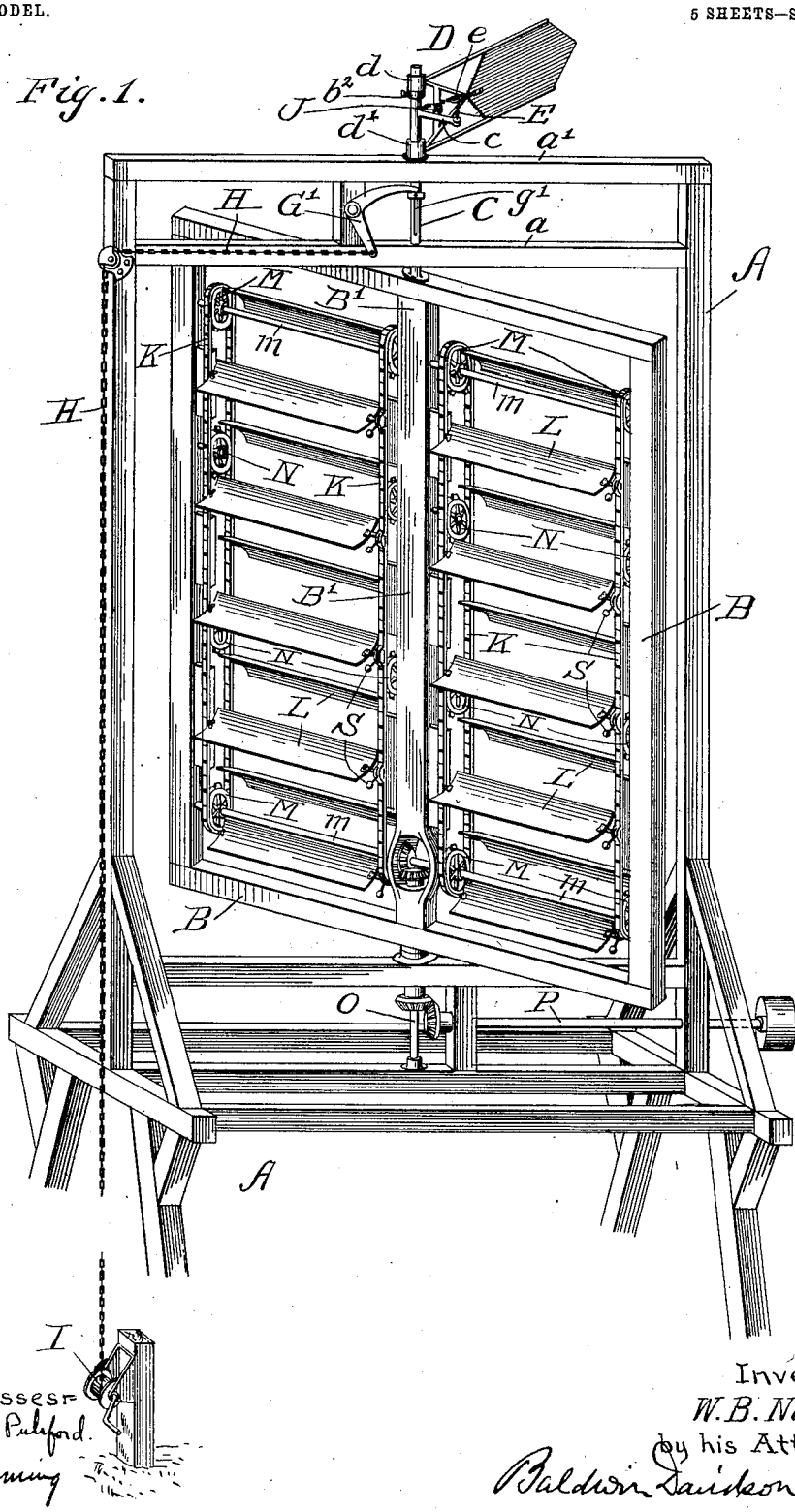

No. 763,623. PATENTED JUNE 28, 1904.
W. B. NANCE.
WIND OR WATER MOTOR.
APPLICATION FILED MAR. 15, 1904.
NO MODEL. 5 SHEETS—SHEET 1.

Witnesses:
Ernest Pulsford.

Inventor:—
W. B. Nance
by his Attorneys,
Baldwin Davidson Wight

No. 763,623. PATENTED JUNE 28, 1904.
W. B. NANCE.
WIND OR WATER MOTOR.
APPLICATION FILED MAR. 15, 1904.
NO MODEL. 5 SHEETS—SHEET 2.
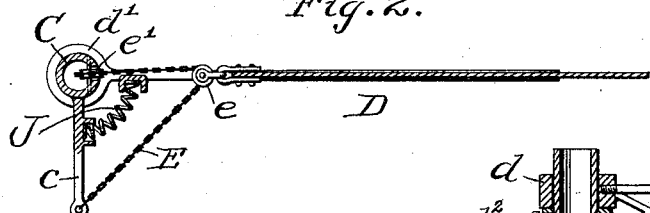
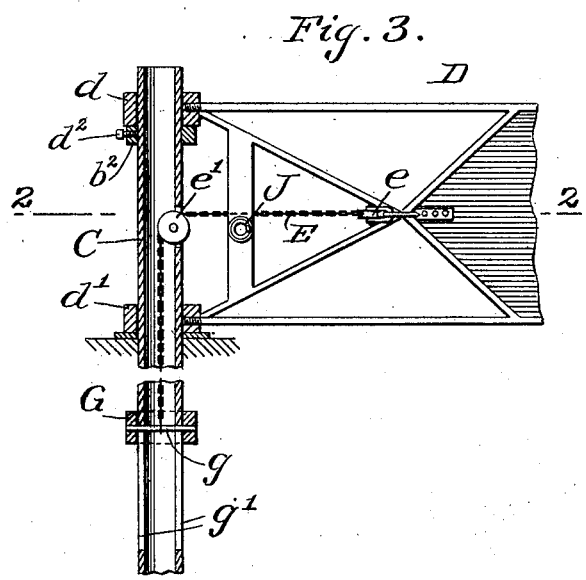
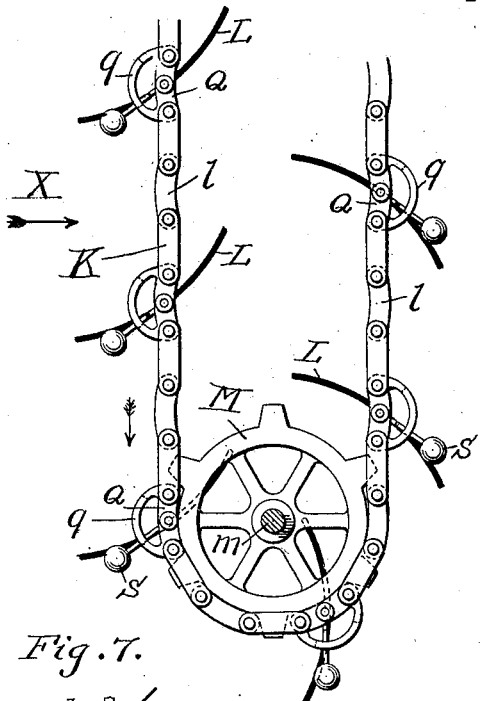
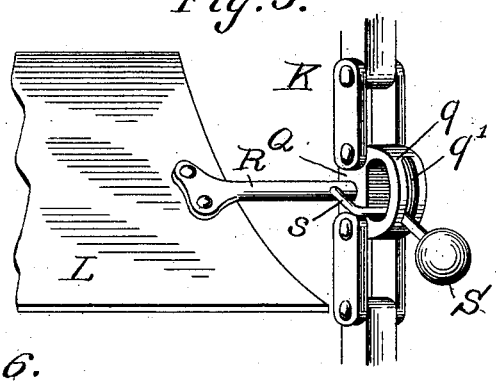
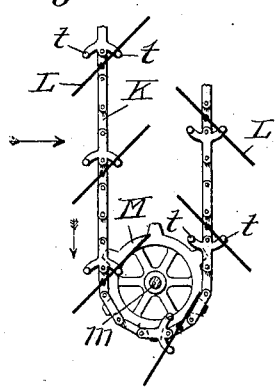
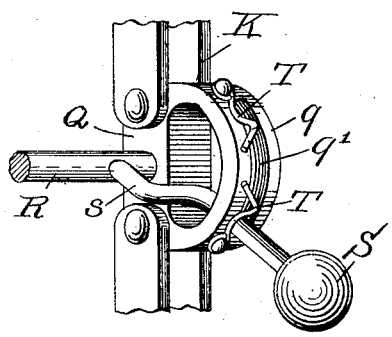
Witnesses:—
Ernest Pulsford
Inventor:—
W. B. Nance.
by his Attorneys
Baldwin Davidson Wight

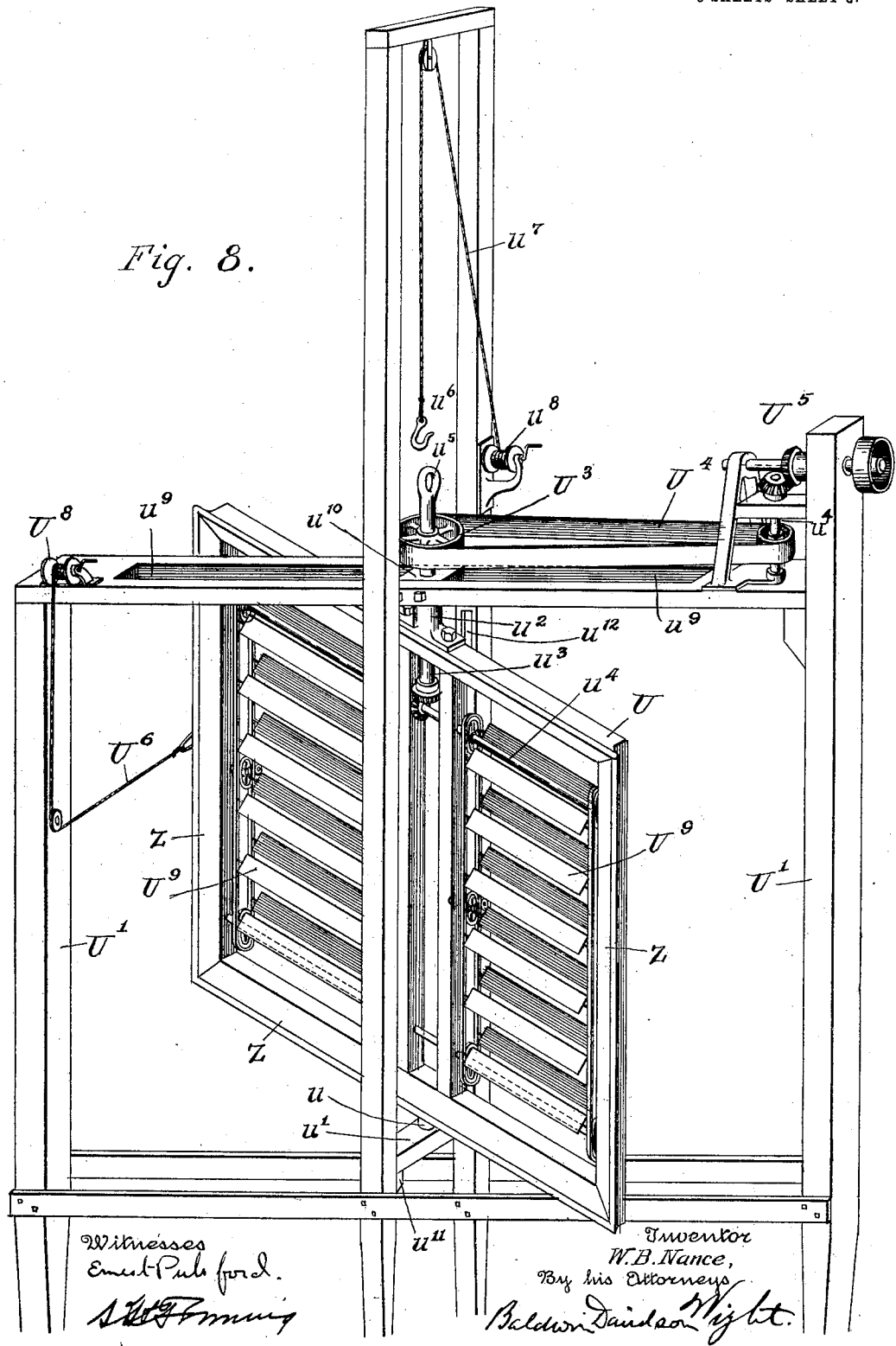

No. 763,623. PATENTED JUNE 28, 1904.
W. B. NANCE.
WIND OR WATER MOTOR.
APPLICATION FILED MAR. 15, 1904.
NO MODEL. 5 SHEETS—SHEET 4.
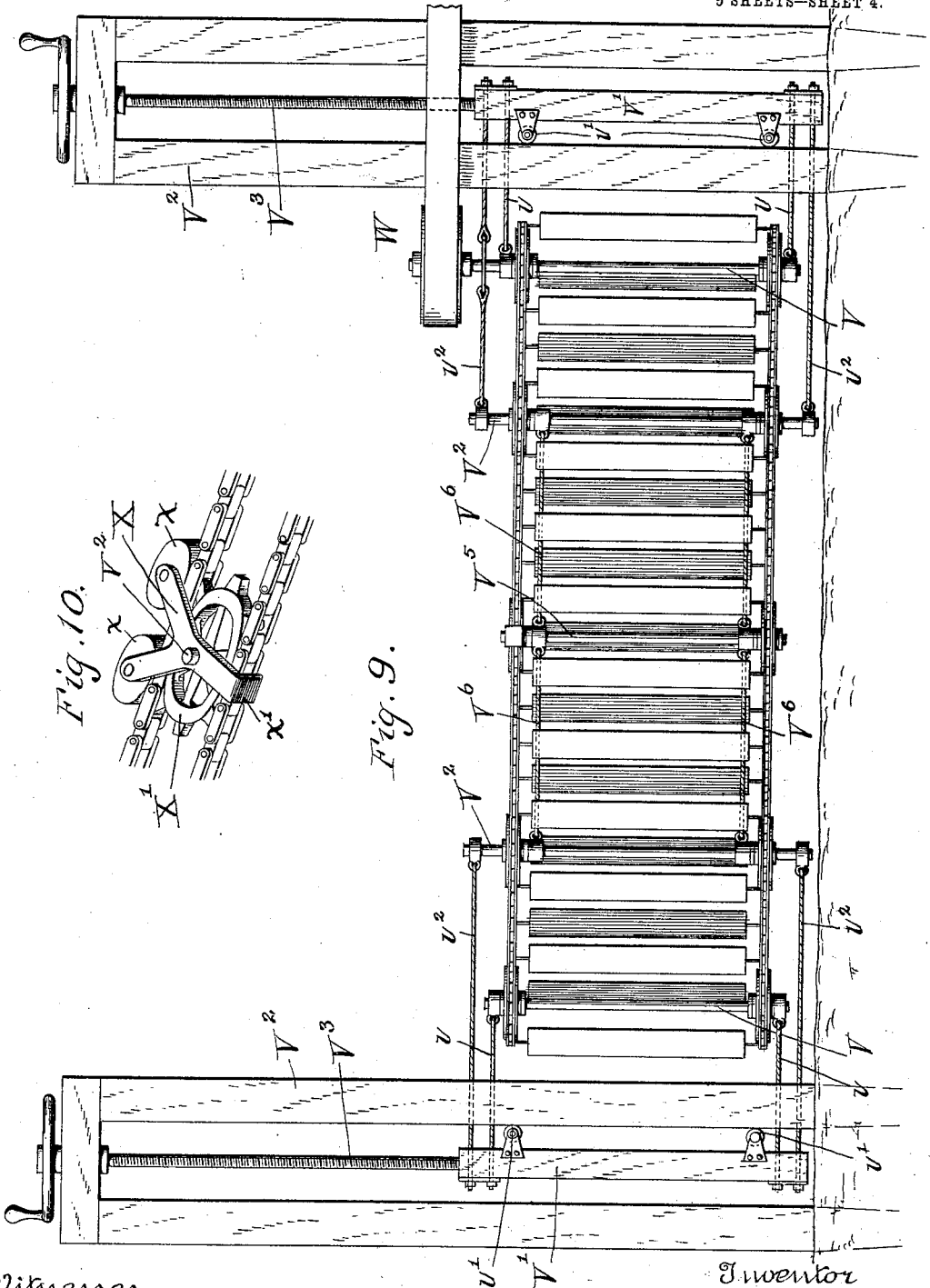
Witnesses
Inventor
W. B. Nance.
By his Attorneys No. 763,623. PATENTED JUNE 28, 1904.
W. B. NANCE.
WIND OR WATER MOTOR.
APPLICATION FILED MAR. 15, 1904.
NO MODEL. 5 SHEETS—SHEET 5.

Witnesses
Inventor
W. B. Nance.
By his Attorneys

No. 763,623. Patented June 28, 1904.

UNITED STATES PATENT OFFICE.

WILLIAM B. NANCE, OF ATCHISON, KANSAS.

WIND OR WATER MOTOR.

SPECIFICATION forming part of Letters Patent No. 763,623, dated June 28, 1904.

Application filed March 15, 1904. Serial No. 198,315. (No model.)

*To all whom it may concern:*

Be it known that I, WILLIAM B. NANCE, a citizen of the United States, residing at Atchison, in the county of Atchison and State of Kansas, have invented certain new and useful Improvements in Wind or Water Motors, of which the following is a specification.

According to this invention a series of motor wings or blades are mounted on an endless carrier in such manner that the blades on one side of the carrier are made to move in one direction while the blades on the opposite side of the carrier are moved in an opposite direction in such proximity to the first-mentioned blades that they receive not only the direct force of the wind or water, but also the currents of wind or water which glance from the first set of blades. A motor constructed and operated in this manner is, so far as I am aware, entirely new.

My improvements may be embodied in a windmill or in a water-motor and will herein be claimed as applied to a motor of either kind.

The motor wings or blades are preferably dished, and they are pivotally attached to endless chains traversing sprocket-wheels arranged in such manner as to hold the blades in two parallel series. The sprocket-wheels serve for the most part merely to guide the chains; but one or more of the wheels is connected with a shaft which is suitably geared to another shaft, which transmits motion to the part to be driven. In some cases the blades, with their chains, are mounted in a pivoted frame, which may be turned in any desired direction to receive the full force of the wind or water current when desired.

When my invention is embodied in a windmill, the pivoted frame is connected with a vane which always lies in a plane parallel with that of the wind. The connections between the pivoted frame and the vane are adjustable, so that the frame may be brought parallel with the vane and may be held edgewise to the wind when it is desired to throw the motor out of operation.

When my improvements are embodied in a water-motor, the frame which carries the blades and chains may be so arranged in a supporting-frame that it may be raised vertically out of said frame.

Other features of the invention will be herein more particularly described.

In the drawings, Figure 1 is a perspective view of my improvements embodied in a wind-motor. Fig. 2 is a detail view in section, on the line 2 2 of Fig. 3, of the vane and the devices connecting it with the pivoted frame which carries the motor-wings. Fig. 3 is another detail view of these devices, partly in elevation and partly in vertical section. Fig. 4 is a detail view, in side elevation, showing particularly the arrangement of the motor wings or blades on their carrying-chains. Fig. 5 is a perspective view showing more in detail the manner in which the blades are pivoted to the chains and the manner in which these blades are held in working position and moved from one working position to another as they pass around the guide-pulleys at opposite ends of the motor. Fig. 6 is a detail perspective showing a modified way of holding the blades in position and of moving the blades from one working position to another. Fig. 7 is a view similar to Fig. 4, illustrating a modified form of motor-wings and a modified way of mounting them on the carrier. Fig. 8 is a perspective view showing how my improvements may be embodied in a motor adapted to be operated by a water-current. Fig. 9 shows another way in which my improvements may be embodied in a water-motor. Fig. 10 illustrates a construction by means of which the carrier-chain may be braced or guided both at front and rear. Figs. 11 to 16, inclusive, show modified ways of regulating the positions of the wings on opposite sides of the motor.

Referring first to Sheets 1 and 2 of the drawings, wherein my improvements are shown as applied to a windmill, A indicates a supporting-frame for holding the motor in an elevated position to receive the full force of the wind. A motor-frame B is pivotally connected to the main frame A in any suitable way. The frame B is preferably rectangular, as shown, being divided centrally by vertical beam B'. The pivotal connection between the upper end of the frame B and the main frame A is made by means of a tubular pivot or pipe C, which extends through the cross-piece $a$ of the main frame and also through another cross-piece $a'$ a short distance above the cross-piece $a$. The pipe C extends above the cross-piece $a'$, and to this upwardly-projecting portion is pivoted a vane D, the hubs $d$ $d'$ of which are free to revolve on the pipe, the upper hub being supported by a collar $b^2$, secured to the pipe by a set-screw $d^2$. The pipe C is rigidly connected with the frame B, and near its upper end it is provided with an arm $c$, to the outer end of which is attached a chain E, which passes around a pulley $e$ on the vane D some distance from the pipe C. It then traverses a pulley $e'$ inside of the pipe and passes vertically down the pipe in the manner indicated in Fig. 3, where it is attached to a cross-piece $g$, carried by a collar G, that is free to slide vertically on the pipe. The pipe is slotted at $g'$ to permit the pin to move vertically. The collar may move up and down on the pivot-pipe by means of a bell-crank lever G', which is connected with a chain H, suitably guided and connected at its lower end to a winch I. A spring J, interposed between the arm $c$ and the vane D, tends to hold the motor-frame B perpendicular to the plane of the vane—that is to say, directly at right angles with the direction of the wind. When perfectly free to do so, the vane will always hold the motor-frame in this position; but when it is desired to throw the motor out of operation the chain H may be wound up on the winch I, causing the arm $c$ to be drawn around parallel with the vane D. This will of course cause the motor-frame to be moved into a corresponding relation with the vane, and thus thrown out of operation. By merely releasing the chain at the winch the motor-frame may be thrown into the wind automatically by means of the spring J.

The chains K, which carry the motor-blades L, traverse sprocket-pulleys M at the upper and lower ends of the frame and also sprocket-pulleys N, arranged suitable distances apart between the end pulleys. The sprocket-pulleys M are preferably attached to shafts $m$, which are free to revolve in suitable bearings in the frame. The lower shaft $m$ is geared with a vertical shaft O, in turn geared with a shaft P, from which power may be transmitted to the part or parts to be driven.

As shown in Fig. 1, two series of motor-blades are employed, one on each side of the central beam B'; but both series are connected up to simultaneously drive the vertical shaft O. It is obvious that if the chains carrying the motor-blades are made to revolve about the pulleys a rotary motion will be imparted to the lower shaft $m$, which will correspondingly drive the parts geared therewith. Preferably the blades are of the form shown in Figs. 4 and 5, being made concavo-convex or dished, and they are freely pivoted to the carrying-chains.

In order to produce the best results, the blades should be held when in operation at approximately the angles shown in Fig. 4. In order to do this, it is necessary to use stops which limit the movement of the blades, and it is also necessary when centrally-pivoted blades are used to employ weights to hold the blades in position and to move them from one operative position to another when moving around the end sprocket-pulleys. For this purpose some of the ordinary links $l$ of the sprocket-chain are replaced by links Q, which are formed with loops $q$ and slotted at $q'$. The blades L are preferably made of sheet metal, to which are attached arms R, that are pivotally connected with the links Q. From these arms extend bent rods $s$, that pass into the loops $q$ and through the slots $q'$ in the manner indicated in Fig. 5. On the outer ends of the rods are secured weights S, which serve to hold the blades in proper working position and also to move them from one working position to another when reversing. It will be observed that the pivotal movement of the blades is limited by the ends of the slots $q'$, against which the rods $s$ strike.

In Fig. 4 the arrow X indicates the direction of the wind. The blades L on the front side of the motor are turned in such manner as to present their concave surfaces to the wind, which after striking the blades glances upward. The blades at the rear of the motor are arranged in a plane at about right angles to the blades on the front of the motor, and they receive the wind in such manner that the latter glances downward from them. They are also arranged in such manner that they receive not only the direct force of the wind, but also the currents of wind or air that glance upward from the front wings. The effect of the wind on the blades thus arranged is to cause the wings at the front of the motor to move downward, as indicated by the arrow in Fig. 4, and to cause the wings on the rear side of the motor to move upward. The wind acts with equal force on each blade on each side of its pivot and tends to balance it; but in order to prevent the wings from shaking or wabbling I employ the weights S, before referred to. As indicated in Fig. 4, the weighted rods $s$ are held at the bottom of the slots $q'$, which hold the blades in the most desirable position and prevents them from being moved out of this position by the wind. As the blades move around the lower sprocket-pulleys the weights S move by gravity from one end of the loops q to the opposite ends thereof, in the manner indicated in Fig. 4, until the rods s reach the opposite ends of the slots q', at which time the motor-blades will be held in proper position to cause them to receive the wind in the manner before described, so that they will move upwardly. In this way a continuous rotary motion is imparted to the carrying-chains and to the pulleys which the chains traverse. When the blades reach the top of the motor-frame, they are properly reversed in such manner that when they descend they are arranged at the angle shown at the left of Fig. 4.

In order to prevent vibration of the blades, I may employ spring-catches T at the opposite ends of the slots q', and these catches, while sufficiently strong to prevent vibration, are not strong enough to prevent the weights from shifting when passing around the end sprocket-pulleys. The weights may in some cases be dispensed with, and instead of employing concavo-convex or dished blades I may employ flat or straight blades, such as are indicated in Fig. 7. In this case, however, the blades should be pivoted eccentrically, and stops t should be employed to limit the movement of the blades. In this arrangement the wind is caused to glance from the front blades onto the rear blades in the manner before described. The blades, which descend on the front side of the motor, rest on the stops t on the inside of the chains. As the blades pass around the lower sprocket-pulleys the blades shift and bear against the stops t on the outer sides of the chains. The blades reverse in a similar way when they pass around the upper sprocket-pulleys.

While I have shown two sets of motor-blades connected with a driven shaft, it is obvious that one set of blades might be employed, and it is also obvious that the blades need not be made to traverse a vertical plane, as they might also be made to move horizontally.

In Fig. 8 I have shown my improvements applied to a water-motor, although the construction shown in Fig. 8 is also suitable for use as a windmill. As there shown the pivoted frame U is mounted in a supporting-frame U', which may be of any suitable construction and which may be driven into the bottom of a river or stream or may be mounted on the top of an elevated support when used as a wind-motor. The frame U has a pivot $u$, that rests in a cross-piece $u'$ of the frame, and at the top it has a casting $u^2$, through which extends a shaft $u^3$, geared to the shaft $u^4$, which is driven by the blades. The cross-piece rests on a support $u^{11}$ and may slide in guides $u^{12}$. The upper end of the shaft $u^3$ has an eye $u^5$, adapted to engage a hook $u^6$ on a chain or rope $u^7$, connected with a winch $u^8$. By this means the pivoted frame U may be raised out of the frame U'. It will be observed that the top of the frame U' has an opening $u^9$, through which the frame U may pass. This opening is only closed by the block $u^{10}$, which is ordinarily bolted in place, as shown. The bolts may be easily removed, and then the frame may be raised. On the upper portion of the shaft $u^3$ is a pulley $U^3$, around which passes a belt $U^4$, that may convey power to any desired point through the gearing $U^5$. The pivoted frame U may be placed at any desired angle in the frame U' by means of the chain or rope $U^6$, operated by the winch $U^8$. The blades $U^9$ and their chains may be similar to those shown in Figs. 1 or 7 or to those shown in Figs. 11 to 16, inclusive, and they may be operated in a similar way.

Figure 11:
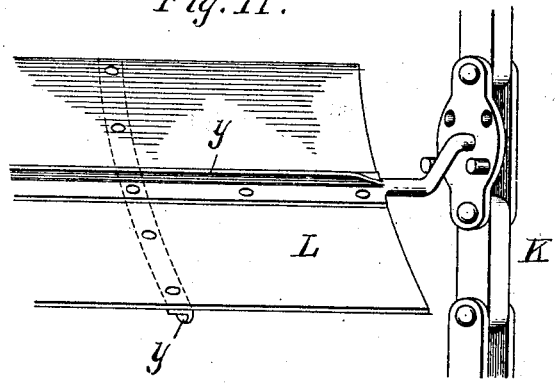
Figure 12:
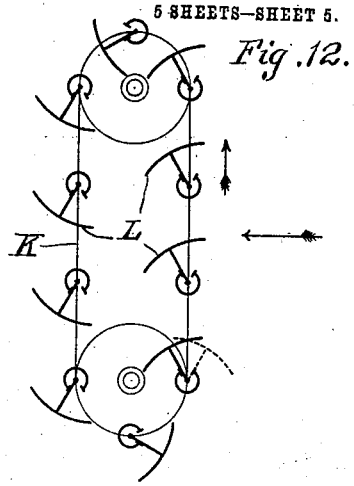
Figure 13:
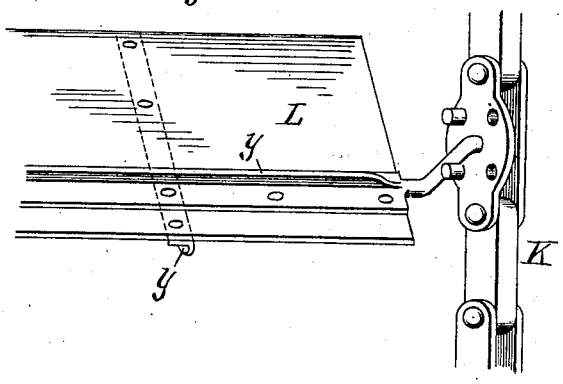
Figure 14:
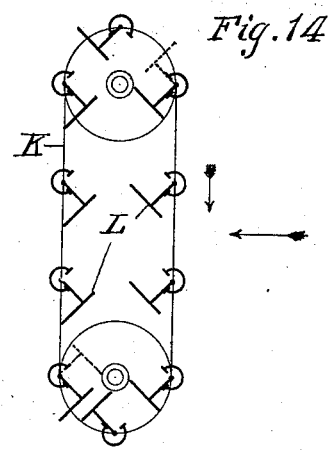
Figure 15:
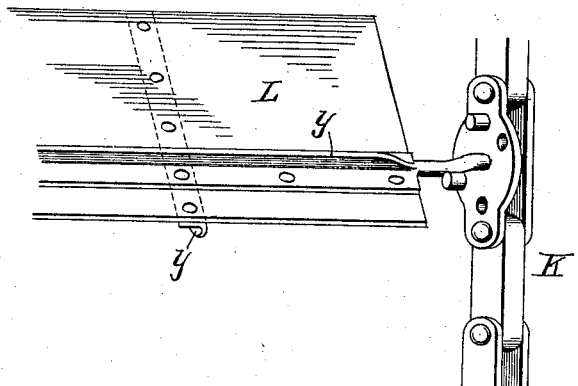
Figure 16:
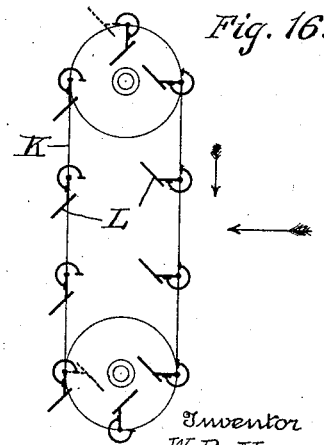

In Fig. 9 I have shown another modification. In this instance I have shown my improvements applied to a motor adapted to be operated by a current of water. The blades and chains are similar to those before described. The shafts V are connected by cables $v$ with frames V', mounted within frames $V^2$ and adjustable vertically therein by means of screws $V^3$. The frames V' have antifriction guide-rollers $v'$, which enable them to be raised and lowered easily. The frames V' are also connected by cables $v^2$ with the shafts $V^2$, carrying intermediate guide-pulleys. Where a fifth shaft $V^5$ is used to carry other guide-pulleys, this latter shaft may be connected with the shafts $V^2$ by means of cables $V^6$. By pulling the cables taut the several shafts, with their pulleys, may be kept in proper line across the water-current, and when the blades are arranged at the proper angle to the current a rotary motion will be imparted to the shafts, which may be conveyed away by means of a gearing W. (Shown at the right-hand side of Fig. 9.) I preferably brace the blades by angle-irons $y$ or other suitable stiffening rods or strips, as indicated in Figs. 11, 13, and 15, and instead of employing the stops illustrated particularly in Figs. 5 and 6 or in Fig. 7 I may employ stops such as are indicated in Figs. 11, 13, and 15. It will be observed that the position of the stops governs the positions of the blades at various times. When the stops are located as indicated in Fig. 11, the blades will assume the positions shown in Fig. 12. When the stops are arranged as shown in Fig. 13, the blades will assume the positions shown in Fig. 14; and when they are located as in Fig. 15 the blades will operate in the manner indicated in Fig. 16. In all cases, however, the arrangement is such as to cause the currents of air or water to glance from the blades on one side to those on the other and augment the effect of the currents of air or water acting on the blades. I preferably arrange to brace or guide the carrier-chains on their rear sides as well as on their front sides, as the wind or water might cause the rear portions of the chains to recede from the guide-pulleys. For this purpose an arrangement, such as shown in Fig. 10, may be employed, where, as will be seen, the shaft $V^2$, carrying two of the guide-pulleys, has secured to its end a frame X, carrying small rollers or pulleys $x$, bearing against the rear side of the chain, and a lug $x'$, bearing against the front side of the chain. The pulleys preferably are arranged to bear against the rear portion of the chain and to prevent it from receding from the guide-pulley X', while the guide-pulley X' supports or braces the front portion of the chain. Such or an equivalent arrangement may be employed for supporting and guiding the carrier-chains in the several modifications illustrated.

The motor-carrying frame may have flaring or beveled faces Z, as indicated in Fig. 8, to cause the wind or water to be concentrated or directed toward the motor-wings.

I claim as my invention—

1. A motor comprising a supporting-frame, endless chains having front and rear parallel portions, guide-wheels on the frame at opposite ends of the chains, motor-wings independently pivoted to the chains and held at all times to present each blade in the space between the front and rear portions of the chains so that the inner ends of the wings shall approach each other closely at the proper angle to deliver the motive fluid from the front wings to the front faces of the wings on the rear side of the motor and stops for limiting the pivotal movement of the wings and for holding them in working position.

2. A motor comprising a series of wings or blades, a flexible endless carrier to which they are pivotally connected, on which they move independently about their pivots and on which they are held at the proper angle with the blades on the front of the motor having portions projecting inside the space between the front and rear portions of the carrier and arranged to deliver motive fluid against the front faces of the wings on the rear side of the motor which also have portions in the space between the front and rear portions of the carrier and guides for the carrier at its ends and also intermediate its ends.

3. A motor comprising a series of wings or blades, a flexible endless carrier having guide-wheels at opposite ends between which the carrier is stretched to present parallel front and rear portions, intermediate guide-wheels for the carrier, and means for reversing the blades as they pass from the front side of the motor to the rear side thereof and for holding them to present portions of the blades both on the front side and on the rear side of the motor within the space between the front and rear parallel portions of the carrier whereby the motive fluid is made to glance directly from one set of blades to the other.

4. The combination of a supporting-frame, a motor-frame connected therewith, a series of motor-blades, endless chains to which they are pivotally connected, means for limiting the pivotal movement of the blades, wheels for guiding the chains at opposite ends of the conveyer, intermediate wheels for guiding the chains and means for raising the motor-frame vertically within its supporting-frame.

5. The combination of a supporting-frame, a motor-frame pivotally connected therewith, a series of motor-blades, endless chains to which they are pivotally connected, means for limiting the movement of the blades, sprocket-wheels for guiding the chains, a vane, an arm projecting from the motor-frame, a chain connected to the other end of the frame, a pulley carried by the vane over which the chain passes and means for operating the chain to vary the angle between the vane and the arm on the motor-frame.

6. A motor comprising a series of concavo-convex wings or blades, a flexible endless carrier to which they are connected and which has parallel front and rear portions on which the blades are held, with portions of the blades both at the front and rear of the carrier arranged between said front and rear portions and at the proper angle with the blades on the front of the motor arranged to deliver the motive fluid against the front faces of the wings on the rear side thereof and means for guiding the carrier.

7. The combination of a series of motor blades or wings, endless chains to which they are pivoted, slotted loops on the chains, weights secured to the rods extending through the slotted loops and secured to the chains and pulleys for guiding the chains.

8. The combination of a series of motor blades or wings, endless chains to which they are pivoted, slotted loops on the chains, weights connected to rods extending through the slotted loops and connected with the wings, catches for holding the rods in the slots, and pulleys for guiding the chains.

9. A motor comprising two endless flexible chains having front and rear parallel portions, a frame in which they are mounted and held parallel with each other, guide-wheels for the chains, a series of motor-blades, each of which is independently pivoted to the chains and each of which projects across the chains to which it is pivoted to present a portion outside the carrier and a portion inside the carrier between the front and rear portions thereof and means for holding the blades in proper position until they reach the opposite ends of the carrier where they are reversed.

10. The combination of a stationary frame, a motor-frame centrally pivoted therein and motors on opposite sides of the pivot of the motor-frame each of which comprises parallel endless chains, sprocket-wheels on which they are supported and guided and motor-wings each of which is independently pivoted and each of which is reversible but is provided with devices for holding it in working position except when reversing at the opposite ends of the conveyer.

In testimony whereof I have hereunto subscribed my name.

WILLIAM B. NANCE.

Witnesses:
C. D. WARD,
J. L. BERRY.